United States Patent [19]

Giani

[11] 4,433,533
[45] Feb. 28, 1984

[54] CYLINDRICAL BALER WITH AUTOMATIC STEERING SYSTEM

[75] Inventor: Angel Giani, Gray-la-Ville, France

[73] Assignee: Deere & Company, Moline, Ill.

[21] Appl. No.: 361,948

[22] Filed: Mar. 25, 1982

[30] Foreign Application Priority Data

Mar. 25, 1981 [EP] European Pat. Off. ............ 81400477

[51] Int. Cl.³ ............................................. A01D 39/00
[52] U.S. Cl. ....................................... 56/341; 56/10.2; 56/15.4; 100/99
[58] Field of Search ........................ 56/341, 15.4, 10.2, 56/15.5, DIG. 15; 100/99, 88

[56] References Cited

U.S. PATENT DOCUMENTS

| | | | |
|---|---|---|---|
| 3,088,263 | 5/1963 | Thompson | 56/15.5 |
| 3,508,384 | 4/1970 | Madre | 56/15.5 |
| 3,996,825 | 3/1976 | Gail | 56/10.2 |
| 4,057,265 | 11/1977 | Grace | 280/468 |
| 4,065,914 | 1/1978 | Phillips et al. | 56/15.5 |
| 4,124,970 | 11/1978 | Bernhardt | 56/DIG. 15 |
| 4,224,867 | 9/1980 | Gaeddert et al. | 100/99 |
| 4,246,743 | 1/1981 | Anstee et al. | 56/341 |
| 4,295,323 | 10/1981 | Maier et al. | 56/10.2 |

Primary Examiner—Paul J. Hirsch

[57] ABSTRACT

Tractor drawn baler for the formation of large diameter cylindrical or round bales. Baler comprises a bale-forming chamber into which the harvest products are fed through an opening by a pickup which removes the harvest products from a windrow. Detecting means such as pivoted arms with feeling rollers engaging the chamber circumference are provided along the length of the bale for detecting the lack of uniformity in the diameter of the latter. Steering means connected to the said detecting means for steering the baler by tansversely back and forth movement (zig-zag) relative to the windrow direct the harvest products toward the part of the bale that has the smallest diameter and thereby reestablishing the uniformity of diameter of the said bale.

17 Claims, 7 Drawing Figures

CYLINDRICAL BALER WITH AUTOMATIC STEERING SYSTEM

BACKGROUND OF THE INVENTION

This invention relates to balers for forming bales from a crop or harvest products gathered from the ground and more particularly for balers for forming cylindrical bales of such products.

One conventional type of such a baler for forming large diameter cylindrical or round bales is tractor drawn and operates to form a bale by picking up harvested products from a windrow as with a pickup mechanism as the baler is advanced over the field. The mechanism transfers the products rearwardly into an opening leading into a bale-forming chamber in which the products are rolled up into a bale between an upper conveyor and a lower conveyor, each being formed of parallel bands or belts. The bale is rotated between the belts about a horizontal axis as it is formed. Such a baler is exemplified in U.S. Pat. No. 3,931,702. Other types of belt conveyor arrangements for forming a bale forming chamber are also known and are exemplified in U.S. Pat. Nos. 4,182,101, 4,121,513, and 4,252,057.

One well known problem associated with the use of such balers results from the fact that the windrow is often narrower than the pickup mechanism and the opening to the bale forming chamber which extend transversely of the windrow. Consequently, if the same alignment of the baler with the windrow is maintained, the harvest products are fed into only a portion of the width of the chamber opening. This, in turn, results in the formation of a bale with a nonuniform diameter. For example, if a larger amount of the harvested products is fed into the central portion of the chamber opening a barrel-shaped bale is formed. For efficient and trouble-free operation of such balers, the formation of a bale of uniform diameter is highly desirable.

One well known solution to this problem is for the driver of the tractor pulling the baler to steer the tractor so that the baler follows a zigzag or sinusoidal path with lateral transversing in relation to the windrow. In this way the presentation of the windrow to the pickup is progressively displaced across the pickup width, thereby producing a bale of uniform cross-sectional diameter. Another disadvantage associated with the requirement to drive in a zigzag pattern is that the driver is required to pay close attention to his driving pattern and the resulting configuration of the baler so that a bale of uniform diameter is formed. To accomplish this, the drive must be frequently looking to the rear.

To avoid the need for a sinusoidal driving pattern, it is proposed in U.S. Pat. No. 4,065,914 to mount a hydraulic cylinder between the frame of the baler and a tongue pivotally mounted at one end to the baler frame and pivotally connectible to the tractor drawbar at the other. The driver can steer the baler by operating the hydraulic cylinder to cause the baler to pivot and undergo a zigzag or sinusoidal movement while the tractor advances along a linear path of travel. Nevertheless, with such an arrangement, the driver still has to pay constant attention to the steering of the tractor, the baler and the bale being formed in the baler in order to form a bale of substantially uniform diameter. It is clear that both systems require a reasonably skilled operator to produce uniform diameter bales and will lead to operator fatigue.

Accordingly, it is an object of this invention to provide an improved cylindrical baler with an automatically actuated steering mechanism which simplifies the bale-forming process, reduces operator fatigue, enables a more exact monitoring of the bale shaped during formation and relies less on the experience of the operator for formation of bales of substantially uniform diameter.

Another object of the invention is to provide an improved baler which enables formation of a cylindrical bale with a more uniform shape and density.

SUMMARY OF THE INVENTION

These and other objects of the invention, which will be apparent from the following description are accomplished by providing a cylindrical baler with a means for detecting the lack of uniformity in the diameter of a bale being formed and with steering means connected to the detecting means for causing the baler to be laterally displaced relative to the windrow to maintain a uniform diameter of the bale during formation. Accordingly the baler is steered automatically and the driver of the tractor pulling the baler need not closely monitor the path of the baler and the shape of the bale being formed therein.

The steering means may comprise two members disposed transversely to the direction of travel of the baler. The members are connectable between the tractor and the baler frame respectively and are relatively displaceable in the transverse direction for transversely displacing the baler frame relative to the windrow and an actuating device for causing the relative displacement of the members. This steering mechanism may be used in conjunction with the detection means for effecting automatic steering of the baler or in the alternative, the steering mechanism may be manually operated.

In accordance with an alternate embodiment of the steering mechanism, the steering mechanism comprises (1) a linkage pivotally mounting the wheels, which support the main frame of the baler, about an axis perpendicular to the axis of wheel rotation and (2) a hydraulic cylinder for effecting movement of said linkage to pivot the wheels about said perpendicular axis.

DETAILED DESCRIPTION OF THE PREFERRED EMBODIMENTS

Figure 1:
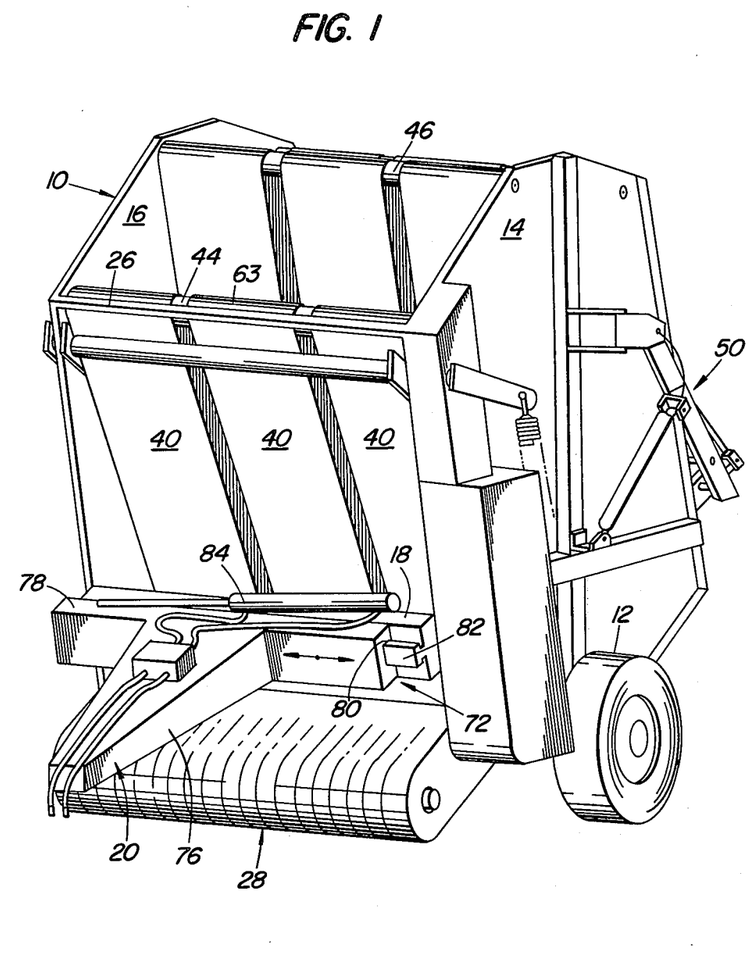
FIG. 1 is a perspective view from the front left-hand side of a baler for forming cylindrical bales of large diameter in accordance with a preferred embodiment of the invention.
Figure 2:
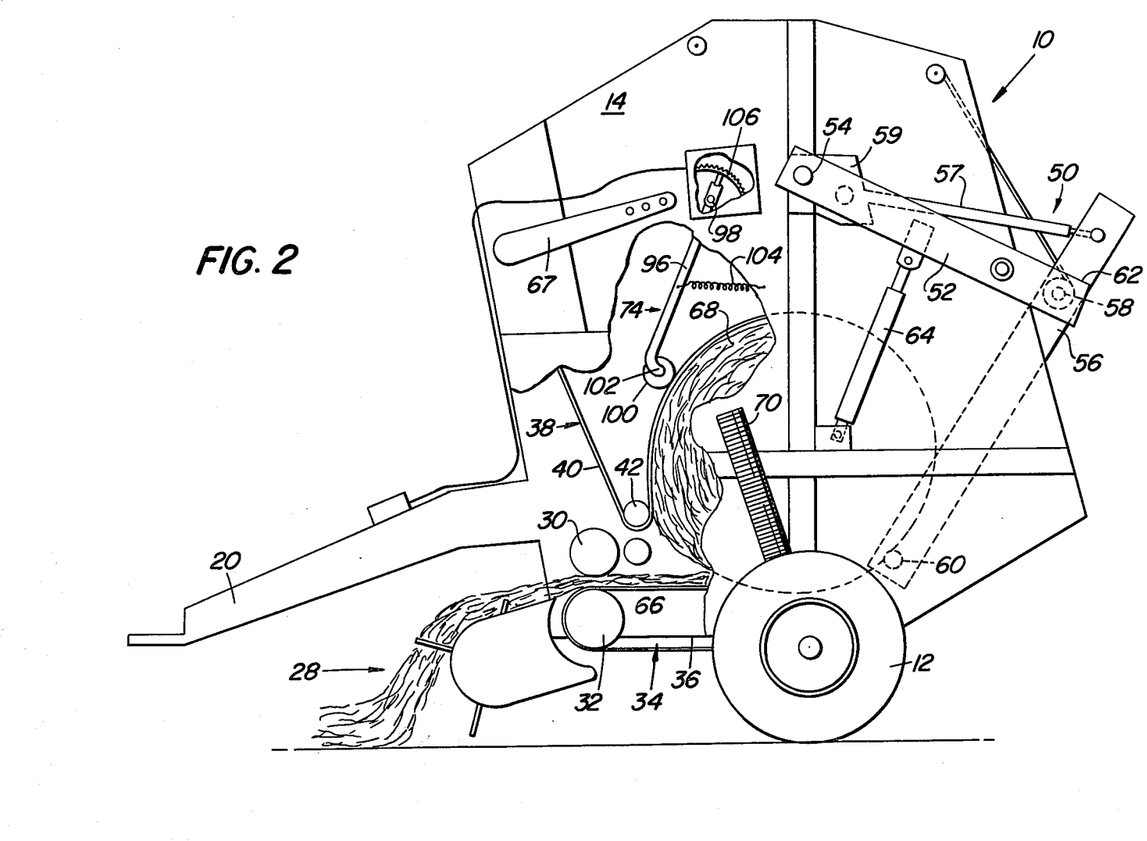
FIG. 2 is an elevational view of the left side of the baler shown in FIG. 1. A portion of the side wall is broken away to show a bale being formed.
Figure 3:
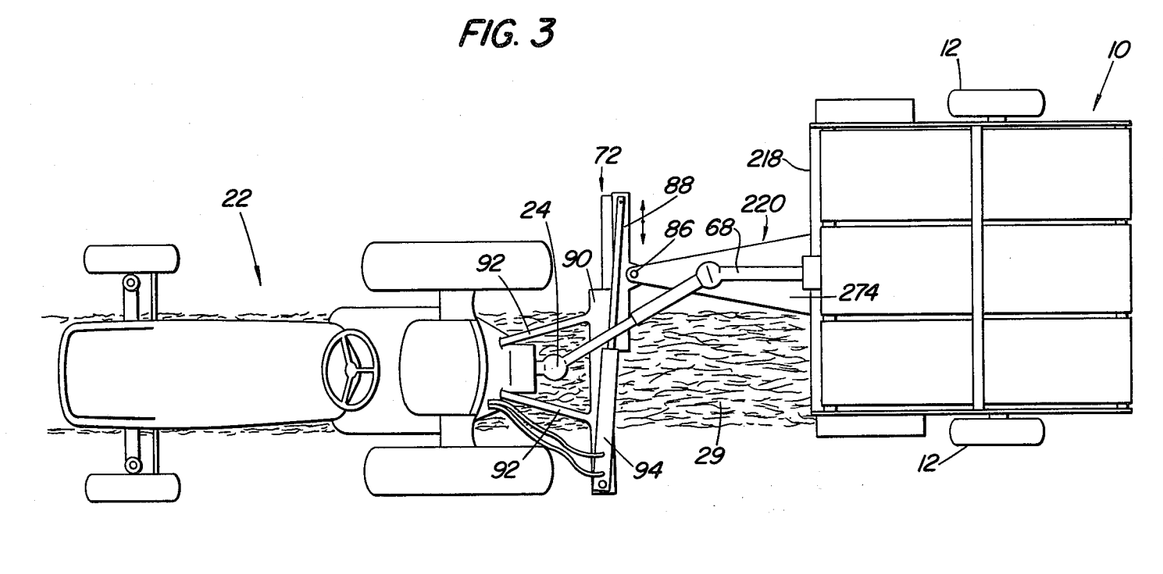
FIG. 3 is a plan view of a baler being pulled by a tractor in accordance with a second embodiment of the invention. The second embodiment primarily differs from the first embodiment in the use of a different coupling mechanism between the main frame of the baler and the tractor.

Reference is now made to FIGS. 1–3 which illustrate two embodiments of a baler in accordance with features of this invention. FIGS. 1 and 2 illustrate the preferred embodiment while FIG. 3 illustrates a secondary embodiment. The two embodiments are identical except where differences are noted.

A baler for forming large diameter cylindrical or round bales from forage or the like, comprises a main movable frame 10 mounted on a pair of wheels 12. Frame 10 has two opposed left and right vertical sidewalls 14 and 16, extending forwardly and rearwardly, which define between them a bale-forming chamber. A transverse beam 18 (FIG. 1) or a beam 218 (FIG. 3) interconnects the front ends of the side walls 14 and 16, and a coupling device or hollow tongue 20 (FIGS. 1 and 2) or a tongue 220 (FIG. 3) extends forwardly from the middle of the transverse beam 18 or 218, respectively, for coupling the baler to a tractor 22 (shown only in FIG. 3), fitted with a conventional rear power take-off 24. Frame 10 also comprises an upper cross-member 26 interconnecting the side walls above the beam 18.

A pickup mechanism 28, which is of conventional construction and which will not therefore be described in detail, is mounted on frame 10 so as to be adjustable vertically by means of a pair of vertically pivotable arms (not shown). Pickup mechanism 28 extends across the width of the frame 10 in front of the bale-forming chamber and harvest products are raised from a windrow 29 lying on the ground during the advance of the baler and transferred rearwardly by pickup 28. Two transverse compression rollers 30 and 32 rotatable in opposite directions extend between the side walls 14, 16 immediately behind the pickup mechanism 28. Harvest products are conveyed rearwardly by pickup 28 to the gap formed between the rollers 30 and 32, which, in turn, transfer the harvest products in web form onto a belt-type conveyor 34. Conveyor 34 extends over the whole width of the baler between the side walls 14, 16 and comprises an endless belt 36 which passes around the lower compression roller 32 and over a rear roller (not shown). Two intermediate rollers (also not shown) extend between opposite side walls 14, 16 and support the upper run of the belt 36. These rollers are located in the same horizontal plane as the lower compression roller 32, so that the upper run of conveyor 36 is substantially horizontal.

An upper band- or belt-type conveyor 38 is arranged between the opposite side walls 14, 16 above the lower conveyor 34 and comprises a certain number of bands or belts 40 which are arranged side-by-side over the width of the baler. Bands 40 pass around a lower front roller 42, an upper front roller 44 and two intermediate upper rollers, one of which is shown at 46, which extend between the opposite side walls 14, 16 and which are in contact with the interior surfaces of the belts 40.

A rear gage system 50 comprises two upper arms 52, the front ends of which are connected respectively to the opposite side walls 14, 16 by pivots 54, and two lower arms 56 which are pivotally connected respectively to the rear ends of the upper arms 52 by transverse pivots 58. Only the arms located on the left-hand side of the machine are shown. Two rods 57 extend respectively between the upper ends of the lower arms 56, above the pivots 58, and brackets 59 provided on the opposite side walls 14, 16. A rear lower roller 60 is rotatably mounted between the lower ends of the lower arms 56, while an upper roller 62 extends between these lower arms coaxially with the pivots 58. The conveyor 38 also passing around the rollers 60 and 62. Two hydraulic cylinders 64 (only one of which is shown) extend respectively between the opposite side walls 14, 16 and the upper arms 52, so as to cause these arms to pivot synchronously about pivots 54 in order to open or close the gate system 50.

The upper and lower conveyors 38, 34, as well as the compression rollers 30, 32, a separator roller 66 located beneath the roller 42 and the mechanism 28 are driven by conventional belt drives located on the left-hand side of the press. The motive force required for the belt drives is supplied in the usual way by a fore-and-aft drive shaft 68 located above the tow-bar 20. The front end of drive shaft 68 is connectible to the power take-off shaft 24 of the tractor (FIG. 3). The rear end of the drive shaft 68 is connected to a transverse drive shaft (not shown by a conventional pair of bevel gears), the left-hand end of this transverse shaft forming the input of the several belt drives for the driven member of the baler.

Initially, during formation of a bale, the rear lower roller 60 is located in front of the location shown in FIG. 2 and about half-way along the length of the conveyor 34. When the harvest products are fed in web form onto the upper run of the lower conveyor 34, the web is displaced rearwardly until it comes into contact with the lower run, which is moving upwardly and forwardly, of the upper set of belts 40 and thereby initiates the rolling up of the web of harvest products. The transverse separator roller 66 separates or detaches the harvest products from the belts 40 so that these products do not pass between the upper compression roller 30 and the roller 42. The separating roller 66 thus defines the front end of the bale-forming chamber and the displaceable rear roller 60 defines the rear end thereof. As the diameter of the bale 68 increases, the rear gate system 50 pivots rearwardly. Rods 57 cause the lower edges of the lower arms 56 to be displaced approximately in a straight line until the rear roller 60 is located above the rear end of the lower conveyor 34.

Obviously, while the diameter of the bale is increasing, the length of belts 40 between the rear lower roller 60 and the front lower roller must expand. A conventional length-compensating mechanism, including a pair of springs 70 (only one shown, FIG. 2) located one on each side of the baler, is provided to permit the adjustment of the length of the belts 40 which forms the bale-forming chamber. The springs 70 produce an increased tension in the belts 40 as the diameter of the bale increases. The tension of the upper belts 40 compresses the harvest products into a bale.

When the formation of the bale 65 is completed, the driver of the tractor normally brings the baler to rest to stop the picking up of additional harvest products by the pickup mechanism 28. The driver then operates a valve (not shown) causing the extension of the cylinders 65 and hence the upward pivotal movement of the gate system 50, so that the completely formed bale is ejected through the gate 50 onto the ground.

FIG. 3 shows that the windrow 28 is distinctly narrower than the pick-up mechanism 28. Consequently, the harvest products are brought, at any given moment, extend across only a portion of the gap between the compression rollers 30, 32. If no steps are taken to remedy this problem, the bale formed in the chamber will be of nonuniform diameter and will have a larger diameter in the part corresponding to the zone of the gap which is supplied with harvest products.

In accordance with the features of this invention to solve this problem, steering mechanism 72 (FIG. 1) or steering mechanism 73 (FIG. 3) is provided for causing lateral displacement of the baler so that the harvest products coming from the windrow will reach the part of the gap that is required for forming a uniform bale. Moreover, a detecting device or feeler 74 is also provided which detects nonuniform cross-sectional diameters of the bale while it is being formed and initiates the appropriate movement of the steering mechanism 72. These features will now be described in detail.

The tongue 20 shown in FIG. 1, has, in plan view, the shape of a T. Tongue 20 comprises a longitudinal leg 76 progressively increasing width along its length in the rearward direction and connected to the tractor by conventional means at its front end and a transverse leg 78 having a groove 80 slidably receives a corresponding guide 82 provided on the transverse beam 18. Groove 80 and guide 82 provide a sliding dovetail connection between the tow-bar 20 and the main frame 10 of the baler, which enables the frame 10 to be displaced transversely to the direction of travel of the tractor.

A hydraulic cylinder 84, pivotally connected at its ends to the transverse leg 78 of the tongue and the beam 18 respectively, provides the force to effect the transverse displacement.

The tongue 220 of the embodiment shown in FIG. 3 differs from that shown in FIGS. 1 and 2 in that it comprises a longitudinal leg 274 which is rigidly connected at its rear end to the transverse beam 218. At its front end, leg 274 is pivotably connected at 86 to a cross member 88 which is connected by a sliding dovetail system to another cross member 90. Member 90 is rigidly connected to two bars 92 carried by the tractor 22. This dovetail connection operates in the same way as that provided between the beam 18 and the transverse limb 78 in the embodiment shown in FIGS. 1 and 2, and it is connected in the same way to a cylinder 94 for producing the transverse displacement of the cross member 99 and frame 10.

Figures 4, 5:
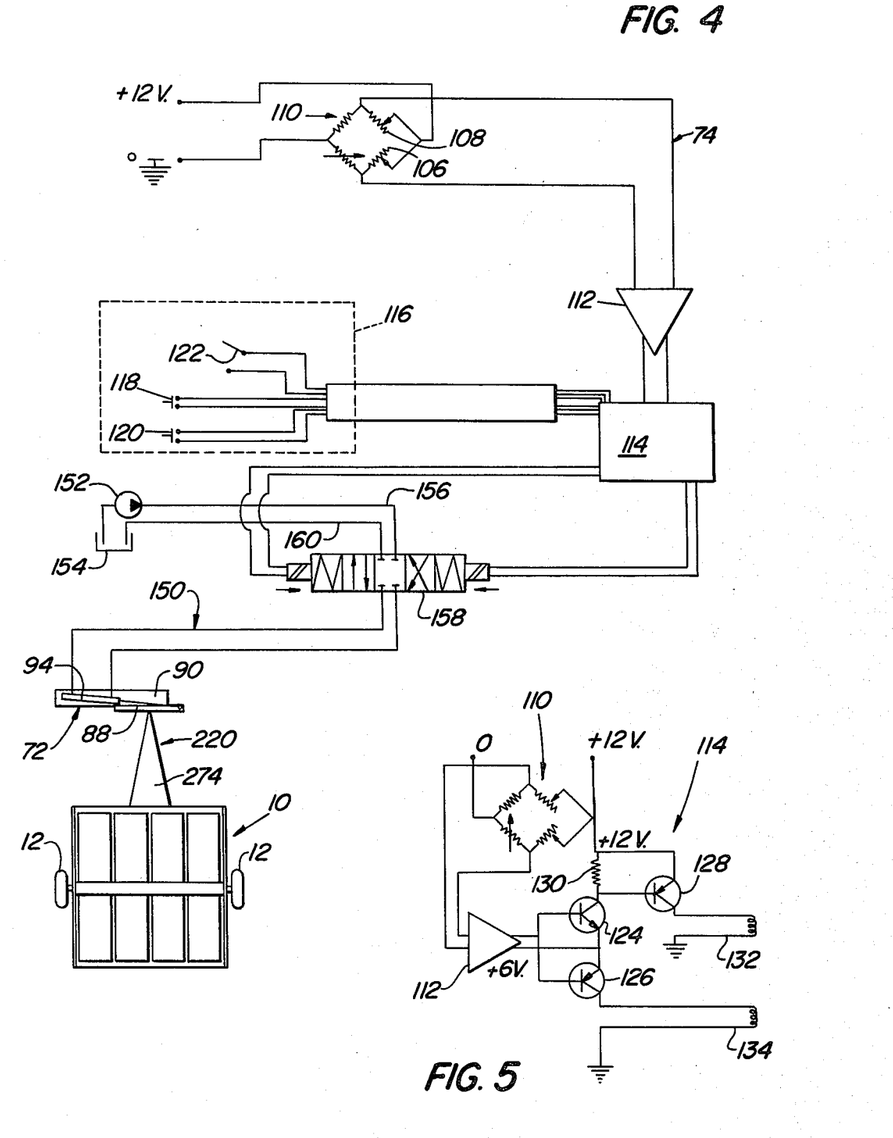
FIG. 4 is a diagram showing a preferred embodiment of an electrohydraulic system comprising a steering mechanism and detecting device for steering the baler shown in FIG. 1 or in FIG. 3. For purpose of illustration, this embodiment of the electrohydraulic system is shown in connection with the second embodiment of the invention shown in FIG. 3.
FIG. 5 is a diagram showing in greater detail, a comparator circuit provided in the detecting device shown in FIG. 4.

The embodiments shown in FIGS. 1 and 2 and in FIG. 3 use the same detecting means or feeler 74 which is illustrated in FIGS. 2 and 4. For convenience in FIG. 4, the detecting means 74 is only illustrated in connection to the embodiment of FIG. 3.

Referring to FIG. 2, a first lever 96 is pivotally mounted near its upper end on a horizontal rod 98 fixed to frame 10. One arm of lever 96 extends downwardly and forwardly from the said bar and carries at its lower end a small rubber gauging wheel 100 which can rotate freely about a horizontal axis 102. Wheel 100 is biased by a spring 104 into contact with the radially outwardly oriented surface of one of the belts 40, so that the wheel will be displaced outwardly as the diameter of bale 68 increases.

Lever 96 is mounted slightly inwardly from the left-hand end of the bale, i.e. from side wall 14. A second similar lever (not shown) is mounted at a corresponding distance inwardly from the other end of the bale.

The shorter arm of lever 96, which extends above the pivot-forming rod 98, is connected to a rheostat 106 so that the movement of the arm varies the effective resistance of the rheostat. In the same way, the second lever is connected to a rheostat 108. The rheostats 106, 108 form part of a conventional electrical bridge circuit 110 to which a potential of 12 volts, for example, is applied. The bridge compares the effective resistance of the two rheostats, which obviously constitutes a measure of the positions of the first and second levers and hence of the diameters of the bale at spaced location along the axis of the bale.

The electrical output of the bridge 110 is applied to an amplifier 112 and the amplified signal is transmitted to an automatic correction circuit 114. An overriding manual control unit, indicated generally at 116, is provided. It comprises manual pushbuttom switches 118 and 120, the function of which will be indicated later, as well as an emergency stop switch 122.

The correction circuit 114 is shown in greater detail in FIG. 5, in which the bridge circuit 110 and the amplifier 112 are also shown. It can be seen that the output of this amplifier 112 is applied respectively to the bases and emitters of two transistors 124, 126. This circuit also includes a third transistor 128, the base of which is connected to the collector of transistor 124 and to a fixed resistor connected to the power supply. Two displacement control relays 132 and 134 are connected between the collectors of transistors 128 and 126, respectively, and ground. The manual switches 118 and 120 enable the voltages required for a lateral displacement of the press to be applied in an overriding manner, as indicated later, whereas the emergency stop switch 122 disables the circuit.

As shown in FIG. 4, the cylinder 94 forms part of a hydraulic circuit 150 comprising a pump 152 which draws liquid from a reservoir 154 and is connected by a pipe 156 to a solenoid valve 158. From this solenoid valve the pipe 156 is connected to one end of the body of the cylinder 94, and a return pipe 160 leading from the other end of the body of cylinder 94 is connected to the reservoir 154 via the solenoid valve 158. The cylinder 94 is of the double-acting type and it can easily be seen from FIG. 4 that the displacement of the spool of the solenoid valve 158 in one direction or the other from the rest position shown in FIG. 4 will produce the expansion or the contraction of cylinder 94, which will bring about a corresponding lateral displacement of the main frame 10 of the press.

The solenoids of the solenoid valve 158 are constituted by relay windings 132 and 134, the connection with the correction circuit 114 being provided by electric leads as shown in FIG. 4, and it will be appreciated that the direction in which the solenoid valve is operated and hence the direction of displacement of the chassis of the baler is to correct for irregularities in the bale diameter detected by the feeler roller 100.

Thus, when a nonuniform diameter of the bale 68 being formed is detected as previously indicated, for example if a smaller diameter appears at the right-hand end of the bale, an electrical signal issuing from the correction circuit 114 is applied to displace the spool of the valve 158 to the right and the cylinder is retracted to slide cross-member 88 into the interior of the fixed cross member 90, i.e., to the left), so that the main frame is displaced to the left. It follows that the windrow 29 is then presented to the right-hand side of the bale-forming chamber and that an increase in the diameter of the corresponding portion of the bale results from this, which restores this portion to the correct diameter. It is clear that the diameter of the said corresponding portion of the bale is increased in proportion to the supply of material thereto and will in due course exceed that attained at another point along the length of the bale. This difference is then detected and cylinder 94 is again operated to displace the main frame 10 to a position such that the products from the windrow 29 will reach the part of the bale that has the smallest diameter. Since all this is carried out automatically, the driver of the tractor need only pay attention to the driving of the vehicle so as to make it follow a normal route corresponding to the windrow.

Figure 6:
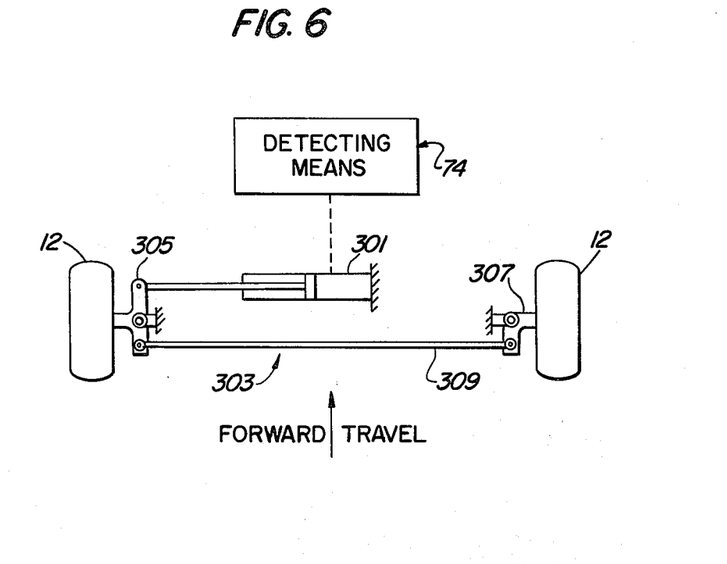
FIG. 6 is a fragmentary top view of another embodiment of the invention utilizing both the steering mechanisms of FIG. 1 and FIG. 3.

In the embodiment of FIG. 1, the steering mechanism 72 may be considered not only as a variant with respect to the steering mechanism 73 in FIG. 3, but also as an arrangement which may be used in conjunction with mechanism 73 when it is desirable to provide means to displace frame 10 to an extent much greater than that which is possible with a single cylinder. As shown in FIG. 6, mechanism 72, 73 may be used in combination by the connection of tongue 20 to cross member 88 and point 86. Cylinders 84, 94 may be hydraulically interconnected so as to be actuated simultaneously, or else they could be operated successively.

Figure 7:
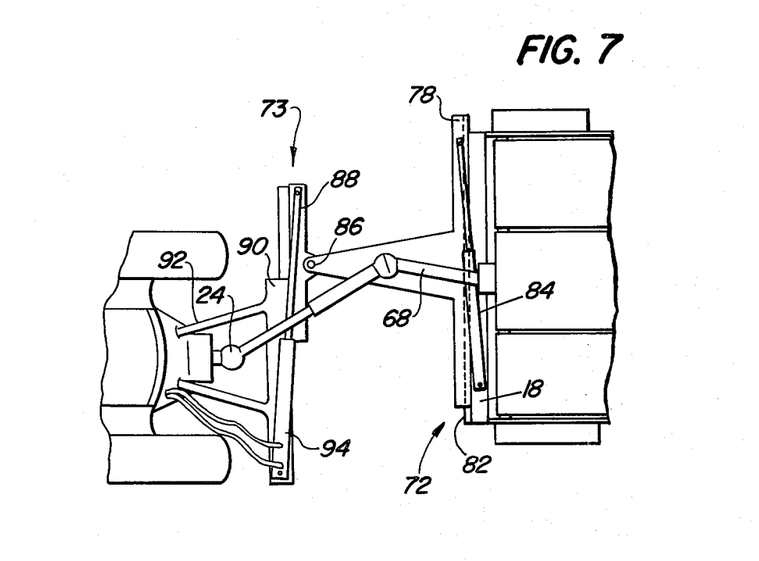
FIG. 7 is a schematic view of a steering mechanism for a baler in accordance with a third embodiment of this invention.

Reference is now made to FIG. 7 which illustrates schematically another embodiment of a steering mechanism. In this embodiment, the sliding beams (elements 18, 78, FIG. 1; elements 88, 90, FIG. 3) are eliminated by the connection of a steering control cylinder 301 (corresponding to cylinders 84, 94 in FIGS. 1, 3) and is connected directly to a steering linkage 303 for steering wheels 12 on which frame 10 is carried. Steering linkage 303 may interconnect to frame 10 in any conventional manner and is comprised of a pair of wheel supports 305, 307 on which wheels 12 are rotatably supported, and cross link 309 pivotably connected at each end to supports 305, 307. Supports 305, 307 are pivotable about a vertical axis and effect the steering of the wheels 12 to the left or right. Main frame 10 is supported on linkage 303 in any conventional manner.

In operation, wheels 12 are turned to the left when the piston of cylinder 301 is extended to the left effecting a simultaneous counterclockwise rotation of supports 305, 307 via cross link 309 which is shifted to right. Similarly, wheels 12 are turned to the right when the piston of cylinder 301 is retracted (to the right). Actuation of cylinder 301 via detecting means 74 is identical to that explained above in connection with FIGS. 2, 4.

In accordance with still another embodiment, means could be provided for steering or directly controlling the wheels 12 so that they follow the movement of the cross-member 88 and/or of the beam 18.

The possibility of steering the baler can also be made use of in connection with the discharge of a completely formed bale. In the type of baler shown in the drawings, and as has already been indicated, the bale is ejected rearwardly, via the raised gate, onto the ground. In this position, it is impossible, so long as the baler is not moved, to close the gate without the latter being struck by and possibly causing damage to the bale. When a bale is ready to be ejected, the overriding manual control 116 is used for displacing the chassis 10 completely to one side. The bale is then ejected and control 116 is used again for returning the frame 10 completely to the other side, which enables the gate to be freely closed.

The baler is preferably arranged to be coupled, in its normal position, directly behind the tractor, but the steering mechanism 72 can be modified enabling the press to be offset to one side of the tractor when in its normal position. In this case, the tractor does not travel along straddling the windrow 29, but rather travels beside the latter and along a parallel path of travel.

According to another variant, the signal required for controlling the form of the bale could be obtained by providing small rubber rollers 100 on both ends of the bale and midway between the ends in order to detect the difference of "slack" in the bale-forming belts. The final signal for actuating the device which controls the lateral displacement of the sinusoidal movement results from a comparison of all the individual signals. Also sensors of the type disclosed in U.S. patent application, Ser. No. 98,280, assigned to the assignee of this application, may be used as the basis for the detecting means herein.

Moreover, although an electro-hydraulic control for effecting the lateral displacement of the chassis has been described above, it is obvious that this control, including the comparison and correcting stage, could be obtained entirely by electrical or hydraulic mechanisms or even by electromechanical, hydromechanical or like means, the detection being itself transmitted by electrical, hydraulic or mechanical means.

The invention herein has been described in connection with certain preferred embodiments thereof. However, other modifications and embodiments will be apparent to those skilled in the art. For example, this invention may be used with cylindrical balers with a wide variety of belt or chain arrangement for defining the bale-forming chamber including the types described in U.S. Pat. Nos. 4,182,101; 4,121,513 and 4,252,057. Accordingly, it is intended that the appended claims cover all such modifications and embodiments as are within the true spirit and scope of the invention.

I claim:

1. In a baler comprising a main frame, a chamber in said frame for the formation of a cylindrical bale from a crop, an opening leading into the said chamber, and a pickup for transferring the crop from a windrow to this opening, the improvement comprising detecting means for detecting the nonuniformity of the diameter of a bale in said chamber, and steering means disposed in front of said pickup responsive to said detecting means for causing said frame to be laterally displaced relative to said windrow to maintain a uniform diameter of the bale during formation.

2. The baler of claim 1, wherein the steering means comprises:
   two members disposed transversely to the direction of travel of the baler, said members connectable between a tractor and the frame respectively and relatively displaceable in the transverse direction for causing displacement of the frame relative to the windrow as the baler is pulled; and
   an actuating device for causing displacement of said members.

3. The baler of claim 2, wherein said actuating device is a hydraulic cylinder connected to the members for relative displacing said members.

4. The baler of claims 2 or 3, wherein said members are constituted by beams, one of said beams having a longitudinal groove and the other of said beams having a longitudinal guide slidably engaged in said groove.

5. The baler of claim 4, wherein said frame comprises a pair of spaced sidewalls disposed, respectively, on opposite sides of the chamber, a first of the beams extending between the front ends of said sidewalls.

6. The baler of claim 5 further comprising a T-shaped element having a transverse leg constituted by the second member and a longitudinal leg pivotally connectable to a tractor.

7. The baler of claim 4 further comprising a towbar rigidly connected to said main frame, one of said members pivotally connected to said towbar.

8. The baler of claim 1, 2 or 3 wherein said detecting means comprises (1) first and second pivotally mounted, spaced arms, each of said arms being displaceable responsive to the increase in diameter at longitudinally spaced points on the circumference of a bale being formed in said chamber and (2) an electrical circuit for detecting positions of said arms and providing an output signal for controlling said steering means responsive to the position of said arms.

9. The baler of claim 8 wherein said arms comprise rollers for gaging the diameter of said bale.

10. The baler of claim 9 wherein said arms are resiliently biased toward said bale.

11. The baler of claim 8 wherein said electrical circuit comprises a rheostat for each arm, an electrical bridge circuit including said rheostats and a correction circuit for receiving an output signal from said bridge circuit and for producing an output signal for controlling said steering means, means for connecting each arm to its respective rheostat and for varying the effective resistance of said rheostat as a function of the movement of the arm responsive to the increase in diameter of a bale being formed in said chamber.

12. The baler of claim 1 further comprises wheels for supporting said main frame and wherein said steering means, includes means for orienting said wheels relative to said main frame for controlling the direction of motion of said main frame.

13. In a baler comprising a main frame, a chamber in said frame for the formation of a cylindrical bale from a crop, an opening leading into said chamber, a pickup for transferring the crop from a windrow to said opening and means for steering said main frame laterally relative to a windrow, the improvement wherein said steering means comprises two members disposed in front of said pickup and disposed transversely of the direction of travel of the main frame, said members connectable between a tractor and said main frame respectively and relatively displaceable in a transverse direction for transversely displacing the frame relative to the windrow and an actuating device for causing the relative displacement of said members.

14. In a method for producing in a tractor-drawn baler a cylindrical bale of substantially uniform diameter, said baler comprising an adjustable bale-forming chamber having an axis transverse to the direction of the movement of the baler and a plurality of endless, side-by-side, flexible belts for defining said chamber and for applying compactive and rolling force to a bale during formation in said chamber, said belts movable in a plurality of laterally spaced parallel planes, said method comprising the steps of towing the baler behind the tractor and over the windrow; picking up a crop windrow and feeding the crop into the chamber tensioning said plurality of belts and increasing said chamber in size responsive to the increasing diameter of the largest axially spaced location on the periphery of a bale being formed in the baler; detecting the relative diameter of said bale at two axially spaced locations on the bale periphery; and generating a signal representative of said relative diameters, the improvement comprising: steering said tractor over and longitudinally of said windrow; and steering the baler relative to the windrow so that a greater quantity of crop material is fed into the portion of the chamber corresponding to the bale periphery location with the smaller diameter responsive to said signal.

15. The method of claim 14 wherein said detecting step includes the step of contacting two of said belts at segments thereof in engagement with the bale periphery.

16. The baler of claim 4 further comprising a second pair of said members; a main frame including side walls, a first beam of said first pair of beams extending between the forward ends of said side walls, the second of said first pair of beams extending forwardly from said first beam of the first pair of beams, a first of the beams of said second pair of beams connected to the second of said first pair of beams and the second of said second pair of beams connectable to a tractor.

17. In a method for producing a cylindrical bale of substantially uniform diameter in a tractor-drawn baler comprising the steps: (a) towing the baler behind a tractor and over a windrow; (b) picking up the crop from the windrow and feeding the crop into a bale-forming chamber of the baler; (c) steering the baler relative to the tractor in a generally sinuous path to form a generally uniform diameter bale; (d) the improvement comprising driving the tractor longitudinally of and over the windrow; and (e) automatically steering said baler responsive to a signal representing the relative diameter of a bale during formation at axially spaced locations on the bale periphery.

* * * * *